3,113,118
FLAME RESISTANT CHLORINATED POLY-
ETHYLENE COMPOSITIONS
Peter J. Canterino and Roger M. McGlamery, Bartlesville, Okla., assignors to Phillips Petroleum Company, a corporation of Delaware
No Drawing. Filed Mar. 25, 1959, Ser. No. 801,694
7 Claims. (Cl. 260—41)

This invention relates to flame resistant compositions which are useful for electrical insulating coatings. The invention also relates to compositions having an ethylene polymer base which are self-extinguishing and have relatively high tensile strength.

Polyethylene is well known for its excellent electrical insulating qualities and is useful in a number of applications such as in house wiring, for small appliance, in electronic equipment for wire insulation, jacketing, and the like. One serious drawback of polyethylene, especially for use in homes, is insufficient flame retardance. Polyethylene can be made more flame resistant by chlorination but even then the material is not self-extinguishing. Antimony compounds, particularly antimony trioxide, can be added to some materials to improve their flame resistance. When polyethylene of the type which has been commercially available for several years is chlorinated and mixed with significant amounts of antimony trioxide it loses practically all of its strength and is not fit for rugged service such as in house wiring. This difficulty has been overcome in part by employing a three-component mixture of polyethylene, antimony trioxide and chlorinated paraffin wax. While the tensile strengths of such blends are satisfactory, their elongation values are quite low. Therefore the amount of inert filler which can be incorporated into them to lower their cost is quite limited.

We have discovered that a particular type of ethylene polymer can be chlorinated and blended with antimony compounds to yield a rugged, self-extinguishing composition that has a relatively high tensile strength and sufficient elongation to permit heavy loading with inert filler. The ethylene polymer which must be employed in the compositions of our invention are those which have a relatively high density and high degree of crystallinity, for example, a density of at least 0.940 gram per cc. at 25° C. and a crystallinity at 25° C. as determined by nuclear magnetic resonance of at least 70 percent. While it has been known that the tensile strength of such highly crystalline ethylene polymers is higher, approximately twice that of polyethylene having a density of about 0.92 gram per cc., it was unexpected that such materials, when chlorinated and mixed with an antimony compound in amounts necessary to impart a self-extinguishing character, would have tensile strengths of 4 to 5 times that of corresponding compositions formed from the low density polyethylene. It was furthermore quite unexpected that our improved materials would have a relatively high tensile and at the same time have a high percent elongation, many times higher than the elongation of blends of low density polyethylene, antimony trioxide and chlorinated paraffin wax. The high elongation of the materials of our invention permits a heavy loading of inert mineral fillers so that a rugged insulating composition is provided at relatively low cost.

It is an object of our invention to provide an improved electrical insulating composition. Another object of our invention is to provide a self-extinguishing insulation having a base of chlorinated ethylene polymer. Still another object is to provide a flame retardant composition that can be heavily filled with inert minerals. Other objects, advantages and features of our invention will be apparent to those skilled in the art from the following discussion.

As has been pointed out above and will be illustrated in the examples to follow, the type of ethylene polymer which is employed for our compositions is very critical. Polyethylene having a density of about 0.92 gram per cubic centimeter and a crystallinity in the neighborhood of 60 percent has been employed for some time as an electrical insulation. Such polymers are commonly referred to as "polythene" and are prepared at extremely high pressures of about 500 to 3000 atmospheres. Since the development of processes employing much lower pressures to produce a more dense and more highly crystalline polyethylene, polythene has been referred to in the art as "low density polyethylene." By comparison the ethylene polymers which are suitable in our invention must have a density at 25° C. of at least 0.940 gram per cubic centimeter and more preferably the density is at least 0.950 and higher, for example about 0.970 to 1.00. This ethylene polymer can be further characterized by its degree of crystallinity which must be at least 70 percent, preferably at least 80 percent, and more preferably in the 90 to 100 percent range. Polyethylene is the preferred material but copolymers of ethylene with either propylene or 1-butene can be prepared to form a polymer having the required properties of density and crystallinity and these copolymers can be used in our invention. In order to meet the requirements of density and crystallinity the monomer mixture from which the copolymers are prepared should contain at least 70 weight percent ethylene based on the total monomer.

Several catalytic methods are known by which these high density ethylene polymers can be prepared. We prefer to use the process which is described in the patent to Hogan et al., U.S. 2,825,721, issued March 4, 1958. In this process a catalyst is employed which comprises chromium, a portion of which is hexavalent (preferably at least 0.1 percent by weight of the total catalyst), as chromium oxide associated with at least one oxide from the group consisting of silica, alumina, zirconia and thoria. The total chromium content of the catalyst is preferably between 0.1 and 10 weight percent.

In this process the polymerization is ordinarily carried out at a temperature between 150 and 450° F. and the pressure of the reaction can vary over a wide range, for example from atmospheric pressure to 100 pounds per square inch absolute or higher. The reaction can be carried out in a gaseous phase but when a diluent is used, the minimum pressure is that necessary to maintain the diluent in a liquid phase. Preferred diluents are solvents which are liquid, nondeleterious and inert under contacting conditions, such as hydrocarbon solvents, especially naphthenic hydrocarbons and paraffinic hydrocarbons having from three to twelve carbon atoms, for example, propane, isooctane, cyclohexane, normal pentane, isopentane and methylcyclohexane. In such cases the reaction pressure is ordinarily in the range of about 100 to 800 pounds per square inch absolute. Another suitable method is a low pressure process in which the polymerization is effected in the presence of catalyst systems which preferably comprise an organometal derivative as one component. Such catalyst compositions can have two or more components, one component being an organometal compound, metal hydride, or a group I, II or III metal and the other component being a compound of a group IV to VI metal. With certain of the above two component systems an organic halide having 30 or less carbon atoms per molecule or a metal halide can be advantageously used as a third catalyst component. Specific examples of suitable catalyst systems are triethylaluminum and titanium tetrachloride, mixtures of ethyl aluminum halides and titanium tetrachloride, titanium tetrachloride and sodium, aluminum, or magnesium, and titanium tetrachloride with lithium aluminum hydride and ethyl bromide.

The halogenation process to form the material for our invention can be carried out by dissolving a polymer of the type above described in a suitable solvent and contacting the resulting solution with a free halogen, chlorine being preferred. Such a chlorination can be carried out in a single step or in two stages in which steps one and two have different conditions of temperature and pressure or different solvents for the chlorinated product. For example, this polymer can first be dissolved in a solvent such as tetrachloroethane, chlorobenzene, or dichlorobenzene, and the halogenating agent, for example, chlorine, then introduced until a product containing at least thirteen weight percent combined chlorine is obtained. The temperature at this stage of the chlorination is at least sufficient to cause all the polymer to dissolve in the solvent and can suitably range from about the melting point of the polymer (at least 113° C.) to the refluxing temperature of the solvent so long as no degradation of the polymer occurs. It is preferred to operate at a temperature which does not exceed about 130° C. The mixture is agitated during chlorination and when the polymer chlorine content reaches about 13 to 20 percent, the mixture is cooled and a lower boiling solvent, such as carbon tetrachloride or similar material, is added. The chlorination is then continued until a product having the desired chlorine content is provided. Agitation should be continued and the reaction temperature of the second step is from about 25° C. to the reflux temperature of the solvent employed. The temperature must be maintained high enough to keep the polymer in solution.

Another suitable method of chlorination involves dissolving the polymer in a volatile solvent such as carbon tetrachloride at a temperature above the normal boiling point of the solvent and a superatmospheric pressure sufficient to maintain the solvent substantially in a liquid phase, for example, about 80 to 120° C. and 5 to 100 pounds per square inch gauge. A chlorination agent is then added. Usually elemental chlorine is passed through the solution until a partially chlorinated product, normally containing about 15 weight percent combined chlorine is obtained. This intermediate product is soluble in carbon tetrachloride at atmospheric pressure and temperatures up to the boiling point of carbon tetrachloride. The temperature and the pressure can then be lowered, for example, to about 50 to 70° C. and atmospheric pressure, and the chlorination continued to the desired extent. The solvent can be removed by volatilization and the chlorinated polymer recovered as a residue. Alternatively an antisolvent can be added to precipitate the chlorinated polymer which can then be recovered by filtration.

Methods of halogenation as above set forth are described in greater detail in the copending applications of P. J. Canterino, Serial No. 442,891, filed July 12, 1954, now U.S. Patent 3,060,164, and P. J. Canterino and J. N. Baptist, Serial No. 446,666, filed July 9, 1954, now U.S. Patent 2,920,064.

It is generally preferred that halogenation be effected in the presence of a catalyst. The reaction zone can be irradiated with sunlight or artificial light. Ultraviolet light is frequently employed. Catalysts include peroxides and hydroperoxides, e.g., benzoyl peroxide, diisopropylbenzene hydroperoxide and cumene hydroperoxide, and azo compounds, particularly those having cyano groups on the carbon atoms alpha to the azo nitrogen atoms, such as di-methyl and diethyl alpha,alpha-azodiisobutyrate; alpha,alpha-azodiisobutyronitrile; and alpha, alpha-azobis (alpha,gamma-dimethylvaleronitrile).

Ethylene polymer used in our invention is chlorinated to the extent that it contains from 10 to 40 weight percent combined chlorine and for maximum tensile strength we prefer to employ polymer having a chlorine content in the range of 17 to 33 weight percent. This chlorinated polymer is blended with from 5 to 50 parts by weight of an antimony compound per 100 parts by weight of the chlorinated polymer. Antimony compounds which can be used are the oxides, sulfides and oxychlorides of antimony, for example, antimony tetraoxide, antimony pentoxide, antimony oxychloride and antimony trisulfide. We prefer to use compositions containing antimony trioxide since this compound is readily available and can be incorporated into our chlorinated ethylene polymer in substantial amounts to yield a self-extinguishing composition with very little loss of tensile strength.

Chlorinated polyethylene containing from 17 to 33 weight percent chlorine can be blended with our preferred loading of from 10 to 40 parts by weight of antimony trioxide per 100 parts of chlorinated polyethylene to provide a composition which is both strong and self-extinguishing. Such a blend will accept a high loading of inert mineral filler such as titanium dioxide, silica, bentonite clay, Dixie clay, mica, asbestos, and the like. The amount of filler employed will depend upon the specific filler used and the intended application of the composition. Generally the amount of the filler can vary from 0 to 400 parts by weight per 100 parts of the chlorinated polymer. As higher amounts of inert filler are used, lower amounts of the antimony trioxide can be employed in the flame retardant composition.

The materials can be compounded by commonly used methods such as milling on a roll mill, masticating in a Banbury mixer, or the like. As long as a thorough mixing is obtained the method employed is not especially significant in our invention. Other additives such as plasticizers, heat and light stabilizers, and antioxidants can be used in the conventional manner. Plasticizers which are useful are those normally used to plasticize such materials as polyvinyl chloride. The compositions of our invention can be employed as primary electrical insulation, for general purpose jacketing or other types of wire coating in which a material is needed which has a good resistance to flame, a high tensile strength and good flexibility at low temperature. To demonstrate the superiority of our compositions over those employing the low density polyethylene and over the coating compositions of the prior art which use chlorinated paraffin wax, the following examples are presented. The specific conditions and proportions given are meant to be exemplary only and should not be interpreted to limit the invention unduly.

EXAMPLE I

High density polyethylene was prepared in the presence of a chromium oxide catalyst according to the method described in the above-mentioned patent to Hogan et al. and the product obtained therefrom had the following physical properties:

| | |
|---|---|
| Crystallinity, percent | 93±2 |
| Density, grams per cc | 0.961 |
| Ash, percent | 0.05 |
| Color | Light gray |
| Melt index | 0.485 |
| Molecular weight (on melt index) | 44,200 |
| Inherent viscosity | 1.910 |
| Viscosity average molecular weight | 46,700 |
| Flex temperature, °F | 32 |
| Impact (ft. lb./in. notch) (Izod) [1] | 7.5 |
| Brittleness temperature, °F | Below −184 |
| Zero strength temperature, °F | 281 |
| Tensile (compression molded, p.s.i.) | 4,170 |
| Elongation (compression molded, percent) | 24 |

[1] ¼″ x ½″ specimen.

This polyethylene was chlorinated to a combined chlorine content of 25 weight percent and the chlorinated polyethylene identified as chlorinated polyethylene A, was blended with variable amounts of antimony trioxide according to recipes 1 and 2 given in Table I.

A lower density polyethylene identified as DYNH was obtained having the following physical properties:

| | |
|---|---|
| Density, grams per cc | 0.920 |
| Crystallinity, percent | About 60 |
| Elongation, percent | 100 |
| Tensile, p.s.i. | 2050 |
| Stiffness, p.s.i. | 22,500 |
| Flex temperature, °F | −20 |
| Impact, ft. lb./in. notch | 15 |

A portion of this polyethylene, identified as polyethylene B, was chlorinated to a chlorine content of 29.1 weight percent chlorine and this chlorinated polyethylene, identified as chlorinated polyethylene B, was compounded with antimony trioxide according to receipes 3 and 4 given in Table I. According to recipes 5 and 6 of Table I the low density polyethylene B was blended with chlorinated paraffin wax and this blend was mixed with antimony trioxide in the same proportions as used with the chlorinated polymers. The chlorinated paraffin wax was identified as Chlorowax 70 and had a chlorine content of 68 to 73 percent by weight with an average molecular weight of 1060. The approximate chemical formula of this material is $C_{24}H_{29}Cl_{21}$.

*Table I*

| | Parts by Weight | | | | | |
|---|---|---|---|---|---|---|
| Run No. | 1 | 2 | 3 | 4 | 5 | 6 |
| Chlorinated polyethylene A | 100 | 100 | | | | |
| Chlorinated polyethylene B | | | 100 | 100 | | |
| Polyethylene B | | | | | 76.9 | 85.5 |
| Chlorinated paraffin wax | | | | | 23.1 | 14.5 |
| Antimony trioxide | 23.1 | 14.5 | 23.1 | 14.5 | 23.1 | 14.5 |
| Hydrous, tribasic lead sulfate | 1.25 | 1.16 | 1.25 | 1.16 | 1.25 | 1.16 |
| Akraflex C [1] | 0.25 | 0.23 | 0.25 | 0.23 | 0.25 | 0.23 |

[1] Mixture of 35 percent diphenyl-p-phenylinediamine and 65 percent phenylnaphthylamine.

The physical properties of the resulting compositions were determined and a comparison of the physical properties is shown in Table II. Run numbers 1 and 2 are the blends made according to our invention. Run members 3 and 4 are the blends using chlorinated, low density polyethylene while run members 5 and 6 are the prior art materials using the low density polyethylene plus chlorinated paraffin wax.

*Table II*

| | 1 | 2 | 3 | 4 | 5 | 6 |
|---|---|---|---|---|---|---|
| Tensile strength, p.s.i. | 1,739 | 1,956 | 412 | 440 | 1,449 | 1,554 |
| Elongation, percent [1] | 1,643 | 1,691 | 2,007 | 1,950 | 31 | 110 |
| 100 percent modulus | 298 | 299 | 214 | 202 | | 1,143 |
| Flex temperature, °F. [2] | −43 | −43 | −45 | −39 | −23 | −24 |
| Density, grams per cc | 1.3331 | 1.2534 | 1.281 | 1.145 | 1.2000 | 1.1072 |
| Electrical Properties: | | | | | | |
| 1 kc. Dielectric constant | 5.65 | 5.81 | 5.22 | 5.30 | 2.65 | 2.28 |
| 1 kc. Dissipation factor | 0.0113 | 0.0116 | 0.0139 | 0.0157 | 0.00736 | 0.00558 |
| 1 mc. Dielectric constant | 4.44 | 4.59 | | | 2.56 | 2.49 |
| 1 mc. Dissipation factor | 0.116 | 0.106 | | | 0.00464 | 0.00258 |

[1] ASTM D638 (compression molded).
[2] ASTM D1043.

As can be seen from the above data the compositions of our invention have a higher tensile strength than any of the other compositions. This is particularly surprising in view of the low tensile strength of the compositions employing low density polyethylene. Prior art blends using chlorinated paraffin wax had acceptable tensiles but the elongations were so low that incorporation of significant amounts of fillers is precluded. It should be appreciated in this regard that for wire insulation some elongation is necessary so that the wire can be bent in a small radius and the insulation will stretch on the outside of the bend without rupturing. Incorporation of filler tends to reduce elongation values so that a material should have a high initial elongation if filler is to be added. The lower flex temperature of our compositions over that of the blends employing chlorinated paraffin wax also indicates a higher degree of flexibility of our compositions at low temperature and this property would be highly desirable in working with insulated wire in cold regions. The electrical properties which are shown demonstrate that all of the materials tested are suitable in this respect for use in most electrical applications, especially for general house wiring.

In this example, properties of the polyethylene starting materials and the finished blends were determined according to the following procedures:

Crystallinity is determined by nuclear magnetic resonance according to the procedure described by Wilson and Pake, Journal of Polymer Science, 10, 503 (1953), using a polymer sample in equilibrium at room temperature. Such a sample can be prepared by compression molding at 5000 p.s.i. and 170–180° C. for about 5 minutes followed by cooling to 50–60° C. at a rate of about 4° C. per minute (in the 150–120° C. range) and then further cooling to room temperature.

Percentage of ash was determined by placing 9–10 g. of sample in each of two Number 2 porcelain crucibles which had been previously reduced to constant weight by heating in an electric furnace at 1200° F. The crucibles were then heated over a Meeker burner to burn the samples, heat being regulated to prevent spattering. When the burning was essentially complete, the crucibles were transferred to an electric furnace and heated at 1200° F. for two hours, after which they were transferred to a desiccator and allowed to cool to room temperature. Crucibles were then weighed and the amount and percentage of ash calculated, the average from the two determinations being recorded.

In density determinations the specimens should be prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature.

Density was determined by placing a smooth, void-free pea-sized specimen cut from a compression molded slab of the polymer in a 50-ml., glass-stoppered graduate. Carbon tetrachloride and methyl cyclohexane were added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity. With the balance standardized to read 1.000 with a sample of distilled water at 4° C. the specific gravity will be numerically equal to density in grams per cc.

Melt index was determined according to ASTM D1238–52T using 5 samples at 2 minute intervals, averaging the 5 values (weights), discarding any values which deviate from the average by more than 5 percent (by weight), reaveraging and multiplying by 5 to obtain the amount of polymer extruded in 10 minutes.

Inherent viscosity was determined by the method of Kemp et al., Ind. and Eng. Chem. 35, 1108 (1943).

ASTM D638 was used to determine tensile and elongation values. Impact strength (Izod) was determined by ASTM D256. Flex temperature is determined by ASTM D1043–51. Flex temperature is the point on an apparent modulus of elasticity curve at which the apparent modulus is 135,000 p.s.i.

EXAMPLE II

Polyethylene polymerized in the presence of a chromium oxide catalyst was obtained having the following physical properties:

| | |
|---|---|
| Crystallinity, percent | 93±2 |
| Density, grams per cc | 0.962 |
| Volatiles, percent | 0.047 |
| Ash, percent | 0.013 |
| Crystalline freeze point, °F | 252±2 |
| Color | Fair |
| Melt index | 0.647 |
| Molecular weight (from melt index) | 42,400 |
| Tensile (injection molded, p.s.i.) | 4,815 |
| Elongation (injection molded, percent) | 31 |
| Tensile (compression molded, p.s.i.) | 4,552 |
| Elongation (compression molded, percent) | 22 |
| Impact (ft. lb./in. notch) (Izod) [1] | 3.68 |
| Heat distortion temperature, °F | 180 |
| Stiffness, p.s.i. | 149,000 |

[1] ½″ x ½″ specimen.

Volatile matter was determined by placing approximately 20 grams of finely ground (less than 20 mesh) sample in each of two carefully dried 100-ml. beakers, weighing the beaker before and after adding the sample. A piece of tissue was placed over the top of each beaker, this tissue being held in place by a rubber band. The beakers were then placed in a vacuum oven and dried at 170±2° F. for 16 hours under a vacuum of 29–30 inches of mercury. The vacuum was then released and the beakers cooled to room temperature in a desiccator. The tissue covers and rubber bands were then removed and the beakers again weighed and the loss and percentage loss calculated.

Crystalline freeze point determination was carried out by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve. Other methods were as given in Example I. This polymer was chlorinated to a chlorine content of 23.1 weight percent. The composition had a tensile strength of 2740 p.s.i., an elongation of 1120 and a flex temperature of −37° F. This polymer which was tested for flammability as a coating on wire burned at a rate of 1.46 inches per minute. Fifty parts by weight of this chlorinated polyethylene was blended with antimony trioxide and Dixie clay according to the recipe given in Table III.

*Table III*

| | Parts by weight |
|---|---|
| Chlorinated polyethylene A | 100 |
| Antimony trioxide | 10 |
| Dixie clay | 100 |
| Tribase E [1] | 2 |

[1] Basic lead silicate sulfate.

The physical properties of the blend were determined and are shown in Table IV.

*Table IV*

| | |
|---|---|
| Tensile strength, p.s.i. [1] | 1495. |
| Elongation, percent [1] | 139. |
| Flex temperature, °F. [1] | −10. |
| Flammability | Self-extinguishing; no drip. |

[1] As in Example I.

As can be seen from the above data the antimony trioxide compound is a necessary ingredient in these compositions to render them self-extinguishing. Blends of our invention can be employed with a high amount of mineral filler and still retain satisfactory elongation values. In other runs to determine the amount of certain fillers that could be milled into chlorinated polyethylene containing 28 percent by weight chlorine, a satisfactory blend was made containing 100 parts of the chlorinated polyethylene and 300 parts by weight of bentonite clay. Another satisfactory composition was made containing 100 parts by weight of the chlorinated polyethylene, 400 parts of titanium dioxide and 3 parts of a stabilizer.

As will be evident to those skilled in the art, various modifications of this invention can be made, or followed, in the light of the foregoing disclosure and discussion, without departing from the spirit or scope thereof.

We claim:

1. A composition of matter consisting essentially of an antimony compound selected from the group consisting of oxides, sulfides and oxychlorides of antimony, a chlorinated ethylene polymer selected from the group consisting of chlorinated polyethylene and chlorinated copolymers of ethylene with up to 30 weight percent of a monoolefin having 3 to 4 carbon atoms, said ethylene polymer before chlorination having a density at 25° C. of about 0.94 to 1.00 gram per cc. and a crystallinity at 25° C. of about 70 to 100 percent, and up to 400 parts of inert mineral filler per 100 parts by weight of chlorinated polymer.

2. The composition of claim 1 wherein said chlorinated ethylene polymer contains from 10 to 40 weight percent chlorine.

3. The composition of claim 2 wherein said antimony compound is present in an amount of from 5 to 50 parts by weight per 100 parts of said polymer.

4. The composition of claim 2 wherein said antimony compound is antimony trioxide.

5. An electrical insulating composition consisting essentially of 100 parts by weight of chlorinated polyethylene containing 10 to 40 weight percent chlorine, said polyethylene before chlorination having a density at 25° C. of about 0.95 to 0.97 grams per cc. and a crystallinity at 25° C. of about 80 to 100 percent, 5 to 50 parts by weight of antimony trioxide, and up to 400 parts of inert mineral filler.

6. The composition of claim 5 wherein the chlorine content of the chlorinated polyethylene is about 17 to 33 weight percent.

7. The composition of claim 6 containing from 50 to 400 parts by weight of inert mineral filler.

References Cited in the file of this patent

UNITED STATES PATENTS

| 2,480,298 | Happoldt | Aug. 30, 1949 |
| 2,590,211 | Rugar | Mar. 25, 1952 |
| 2,850,490 | Canterino et al. | Sept. 2, 1958 |
| 2,920,064 | Baptist et al. | Jan. 5, 1960 |

FOREIGN PATENTS

| 721,586 | Great Britain | Jan. 12, 1955 |

OTHER REFERENCES

Raff et al.: "Polyethylene," 1956, pp. 406–407, Interscience Publishers, Inc., New York, New York. Copy in Scientific Library.